United States Patent [19]

Haraguchi et al.

[11] 4,452,206

[45] Jun. 5, 1984

[54] IGNITION TIMING CONTROL SYSTEM FOR INTERNAL COMBUSTION ENGINES

[75] Inventors: Hiroshi Haraguchi, Oobu; Ko Narita; Toshiharu Iwata, both of Aichi, all of Japan

[73] Assignee: Nippondenso Co., Ltd., Kariya, Japan

[21] Appl. No.: 428,615

[22] Filed: Sep. 30, 1982

[30] Foreign Application Priority Data

Oct. 7, 1981 [JP] Japan .................................. 56-160663

[51] Int. Cl.³ ............................................. F02P 5/04
[52] U.S. Cl. ...................................................... 123/425
[58] Field of Search ............................... 123/425, 435

[56] References Cited

U.S. PATENT DOCUMENTS

| | | |
|---|---|---|
| 4,002,155 | 1/1977 | Harned et al. ................. 123/425 |
| 4,133,475 | 1/1979 | Harned .......................... 123/425 |
| 4,153,020 | 5/1979 | King ............................... 123/425 |
| 4,257,364 | 3/1981 | Sawada .......................... 123/425 |
| 4,300,503 | 11/1981 | Deleris ........................... 123/425 |

*Primary Examiner*—Ronald B. Cox
*Attorney, Agent, or Firm*—Cushman, Darby & Cushman

[57] ABSTRACT

In ignition timing control system for an internal combustion engine, a knocking detector is provided to detect knockings of the engine, and a control unit responsive to the knocking signals of the knocking detector to provide a variable retard amount signal per one knocking which depends on whether the occurrence of another knocking is decided before the lapse of a predetermined time interval from the decision of the knocking.

11 Claims, 12 Drawing Figures

IGNITION TIMING CONTROL SYSTEM FOR INTERNAL COMBUSTION ENGINES

BACKGROUND OF THE INVENTION

The present invention relates to an ignition timing control system having the functions of detecting a knocking by a vibration or a noise generated in or outside of a cylinder of an internal combustion engine by the pressure therein and retarding the ignition timing if a knocking is detected.

In recent years, what is called the knocking feedback system for detecting a knocking caused in an internal combustion engine and retarding the ignition timing has been studied variously. Such a system will be described briefly. Specifically, a vibration or a noise caused in or outside of an internal combustion engine is detected by the pressure in the cylinder, and if the vibration or the noise, as the case may be, exceeds a set level (a knocking decision level), a knocking is decided thereby to generate a knocking signal. When this knocking signal is generated, the ignition timing is retarded, while in the absence of a knocking signal, the ignition timing is advanced, so that the ignition timing is always controlled to a knocking limit or thereabouts thereby to improve the fuel efficiency and output performance of the engine.

In this knocking feedback system, the amount of retard per knocking upon detection of a knocking is predetermined and generally approximately 1° CA (crank angle). This retard amount per knocking is a most important factor affecting the controllability of the ignition timing. This will be explained with reference to FIG. 1. As seen from FIG. 1, in order to improve both the ignition timing controllability under normal conditions and the ignition timing response under transient conditions, it is absolutely necessary to discriminate the normal and transient conditions and switch the retard amount per knocking therebeween.

Conventionally, however, for lack of means for discriminating the normal and transient conditions accurately, it has so far been impossible to switch the retard angle per knocking. In the method of switching the retard amount by detecting the acceleration of the engine, for instance, an unnecessarily large retard may be caused by a setting of a large retard, often deteriorating the engine acceleration performance, due to the fact that the difference of engines or environmental conditions may lead to a small knocking even under an accelerated state. For this reason, the retard amount is conventionally set at a compromise (such as 1° CA) between the normal and transient conditions, with the result that the performance is deteriorated unavoidably under both normal and transient conditions.

SUMMARY OF THE INVENTION

In view of the above problem, a first object of the present invention is to provide an ignition timing control system for internal combustion engines wherein in the case where knocking signals is produced from a knocking detector circuit successively for a comparatively short period of time predetermined according to the engine conditions including the engine speed, a transient condition is immediately decided so that the retard amount per knocking is increased for an improved transient operating performance, while in the case where knocking signals fail to be produced successively for the same period of time, a normal condition is decided so that the retard amount per knocking is held at a comparatively small level for an improved normal operating performance.

This process is based on the fact that under normal conditions knockings occur comparatively infrequently with the ignition timing controlled by a knocking feedback system, thereby leading to a comparatively long intervals of knockings, whereas under transient conditions such as sudden acceleration, knockings occur at intervals of about 1 to 3 cycles, resulting in short intervals of knockings, and on the fact that the intervals of knockings under normal conditions depend on the engine conditions such as engine speed or engine vacuum and therefor it is impossible to accurately discriminate the normal and transient conditions unless the period for which knockings are detected is changed according to the engine conditions.

Further, under an idling condition involving a very low speed, emphasis is placed on the starting output disregarding the knocking sound to some degree under transient conditions and for this reason the retard amount is rather required to be held at a low level. In a high speed range of about 4000 rpm or more, on the other hand, mechanical noises are applied to the knocking detector so that an erroneous knocking decision may cause knocking pulses to be produced successively for a very short period of time. Under these special engine conditions, it is desirable to substantially nullify the function of changing the retard amount in accordance with the successive occurrence of knockings. A second object of the invention is attained by such a feature.

According to the present invention, the normal and transient conditions are discriminated always accurately for all engine conditions by the signals produced from a knocking detector, thus greatly improving the performance under both normal and transient conditions as compared with the prior art. Also, a transient condition detector is not provided separately, thus improving the performance at low cost.

DESCRIPTION OF THE PREFERRED EMBODIMENTS

Figure 1:
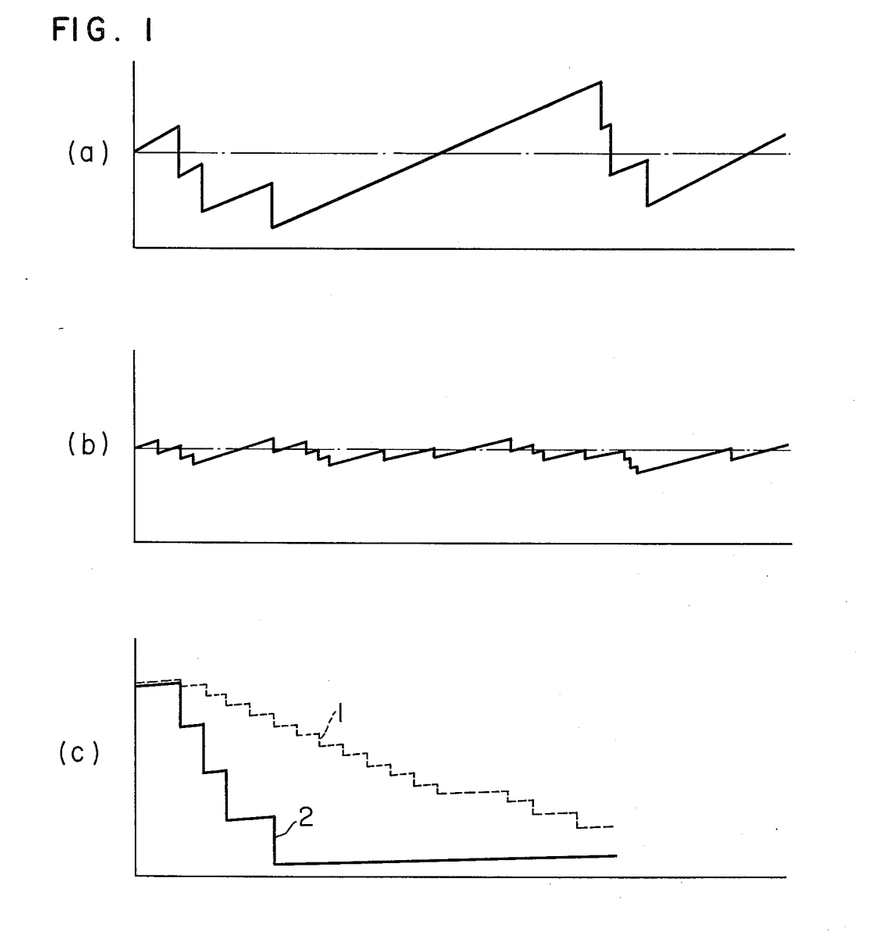
FIG. 1 is a characteristic diagram showing the relation between the change of ignition timing and retard amount.

FIGS. 1(a) and 1(b) represent variations of ignition timing under normal conditions, and FIG. 1(c) shows the response of ignition timing under transient conditions. In FIGS. 1(a) to 1(c), the abscissa represents time, and the ordinate ignition timing.

Variations of ignition timing under normal conditions involving a large retard amount per knocking (such as 2° CA) are shown in FIG. 1(a), and variations of ignition timing under normal conditions involving a small retard amount per knocking (such as 0.5° CA) are shown in FIG. 1(b). In FIGS. 1(a) and 1(b), the one-dot chain represents the ignition timing providing a target for ignition timing control, which is generally the ignition timing of trace knock limit. At this ignition timing, the engine is properly knocked for an improved fuel consumption rate and output. Comparison between FIGS. 1(a) and 1(b) shows that the controllability under normal conditions increases with the decrease of the retard amount per knocking (FIG. 1(b). This is explained by the fact that when a large retard amount is involved (FIG. 1(a), the ignition timing is displaced greatly from the target ignition timing, so that if the ignition timing is displaced toward the advanced side, the knocking sound increases, while if the ignition timing is displaced toward the retarded side, the loss of output and fuel consumption are caused.

If the retard amount per knocking is reduced excessively, however, the sound-deadening effect on the knocking is reduced. The retard amount of about 0.3 to 0.5° CA is therefore preferable under normal conditions. As seen from above, the controllability of ignition timing under normal conditions is improved with the decrease in the retard amount per knocking.

The reverse is the case for the ignition timing response under transient conditions. The ignition timing response under transient conditions (sudden acceleration) is shown in FIG. 1(c). In FIG. 1(c), reference numeral 1 designates the response for a small retard amount (say, 0.5° CA), and numeral 2 the response for a large retard amount (say, 2° CA). This graph shows that in the case where the retard amount per knocking is small (such as 1), the ignition timing response is low so that under transient conditions such as sudden acceleration, knockings occur successively to the discomfort of the driver, finally damaging the engine. Under transient conditions, therefore, the retard amount per knocking is required to be increased.

Figure 2:
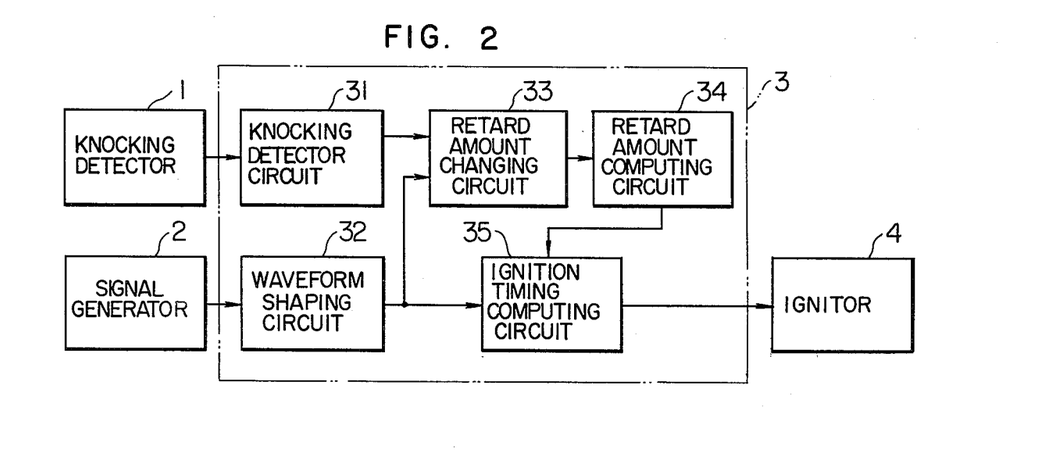
FIG. 2 is a diagram showing a general configuration of a first embodiment of the present invention.

The present invention will be explained below with reference to an embodiment shown in FIG. 2 to 12. FIG. 2 is a block diagram showing a first embodiment of the present invention. In FIG. 2, reference numeral 1 designates a knocking detector for detecting variations of the engine associated with the knocking thereof by a piezoelectric element or electromagnetic means such as magnet or coil. Numeral 2 designates a signal generator which is incorporated in a distributor (not shown) for setting a basic ignition timing in accordance with a vacuum advance device. Numeral 3 designates a control unit for determining an actual ignition timing in response to signals from the knocking detector 1 and the signal generator 2 and producing an ignition timing control signal, and numeral 4 an ignitor for current-amplifying the ignition timing control signal for deenergizing the ignition coil (not shown). The ignition timing control circuit 3 is configured as described below. Numeral 31 designates a knocking detector circuit for detecting whether or not a knocking of the engine has occurred in response to an output of the knocking detector 1, numeral 32 a waveform shaping circuit for waveform-shaping the pickup signal of the signal generator 2 and producing a basic ignition timing, and numeral 33 a retard amount changing circuit for detecting whether or not knockings of the engine have occurred successively within a predetermined length of time depending on the engine conditions (the engine speed in this embodiment) in response to the knocking signal produced from the knocking detector circuit 31 and changing the retard amount per knocking in accordance with the occurrence of the knockings. Numeral 34 designates a retard amount computing circuit for computing the retard amount behind the basic ignition timing in response to the knocking signal produced from the knocking detector circuit 31 and the retard amount signal associated with the retard amount per knocking produced from the retard amount changing circuit 33, and numeral 35 an ignition timing computing circuit for determining an actual ignition timing by subtracting the retard amount produced from the retard amount computing circuit 34 from the basic ignition timing produced from the waveform-shaping circuit 32.

Figure 3:
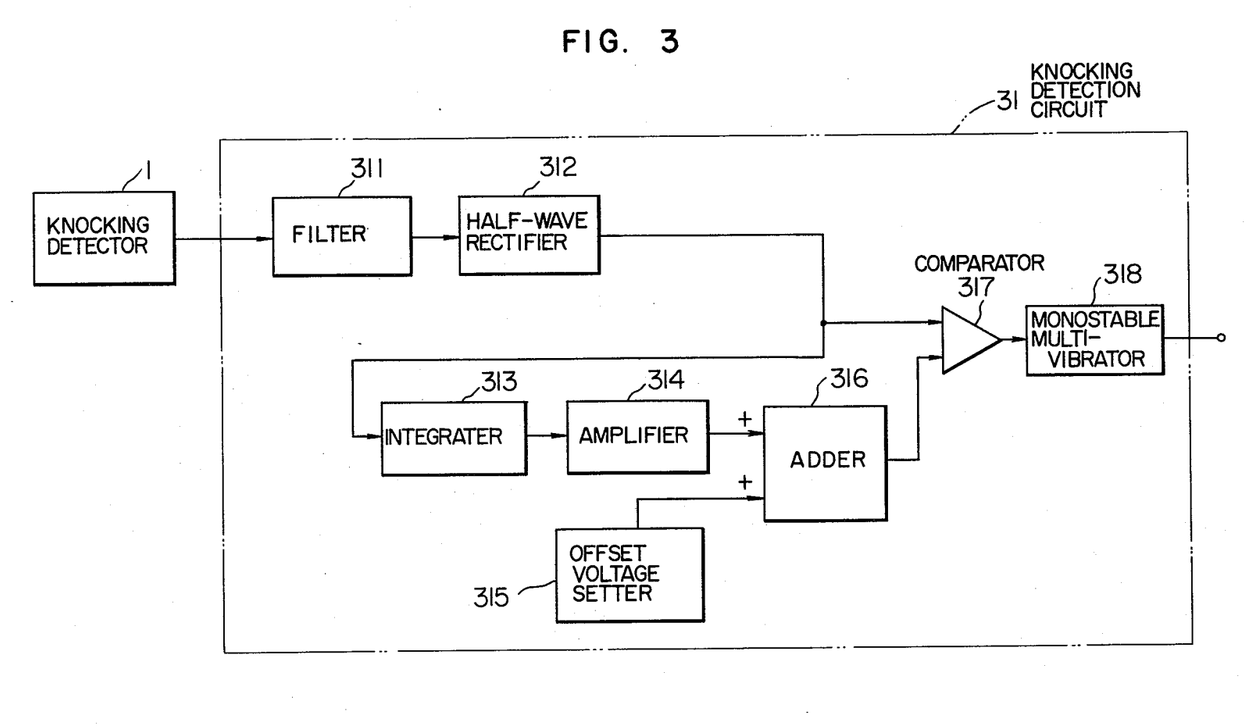
FIG. 3 is a diagram showing a detailed configuration of a knocking detector circuit in FIG. 2.

Now, the configuration of the knocking detector circuit 31 will be described in detail with reference to FIG. 3. Numeral 311 designates a filter such a bandpass or high-pass filter for picking up knocking frequency components selectively out of the output of the knocking detector 1, numeral 312 a half-wave rectifier for half-wave-rectifying the output of the filter 311, numeral 313 an integrator for integrating the output of the halfwave rectifier 312 and producing the average value of the vibration output of the knocking detector 1, numeral 314 an amplifier for amplifying the output of the integrator 313 and producing an appropriate knocking decision level, numeral 315 an offset voltage setter including a resistor for shifting a voltage in order to produce an effect of noise margin or the like in the output of the amplifier 314, numeral 316 an adder for adding the output of the amplifier 314 to the output of the offset voltage setter 315 and producing a final knocking decision level, numeral 137 a comparator for comparing the output of the half-wave rectifier 312 with that of the adder 316 and, when the output of the half-wave rectifier 312 is larger, deciding that a knocking has occurred and producing an output voltage, and numeral 318 a monostable multivibrator triggered at the leading edge of the output of the comparator 317 to hold the voltage signal involved for a predetermined length of time from the triggering.

Figure 4:
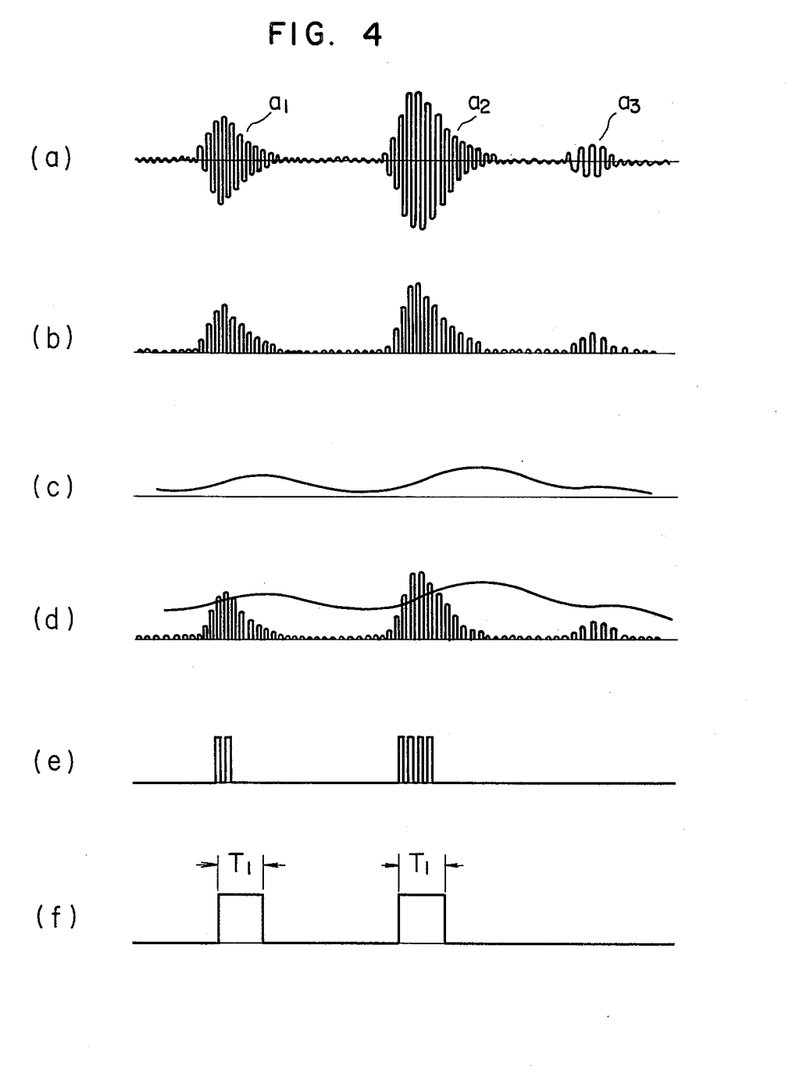
FIG. 4 shows signal waveforms produced at various parts in FIG. 3.

The operation of this knocking detector circuit will be explained with reference to FIG. 4. FIG. 4(a) shows an output signal of the filter 311, that is, a signal obtained by selectively picking up the knocking frequency component (6 to 9 KHz) out of the output of the knocking detector 1. In FIG. 4(a), characters $a_l$, $a_2$ and $a_3$ designate outputs corresponding to three different knockings. Specifically, $a_l$ represents a comparatively small knocking, $a_2$ a comparatively large knocking, and $a_3$ a noise or a very small knocking. FIG. 4(b) shows a signal obtained by half-wave rectifying the signal of FIG. 4(a) by the rectifier 312, and FIG. 4(c) a signal obtained by integrating and amplifying the signal of FIG. 4(b) by the integrator 313 and the amplifier 314. FIG. 4(d) shows a signal obtained by adding the offset voltage to the signal of FIG. 4(c) by the adder 316 (that is, a knocking decision level), which is plotted together with the output signal of the rectifier 312 (FIG. 4(b) by way of comparison. FIG. 4(e) shows an output signal of the comparator 317, which is raised to high state when the output signal (FIG. 4(b) of the rectifier 312 is larger than the knocking decision level (FIG. 4(d) and is reduced to low state in the opposite case. FIG. 4(f) shows an output signal of the monostable multivibrator 318 which is triggered at the leading edge of the output signal of FIG. 4(e) of the comparator 317 and held at high level for a predetermined length $T_l$ of time. As a result, when a knocking occurs, a knocking pulse is produced once for each combustion cycle regardless of the magnitude of the knocking.

Now, the configuration and operation of the retard amount changing circuit 33 and the retard amount computing circuit 34 making up the essential parts of the present invention will be explained in detail.

Figure 5:
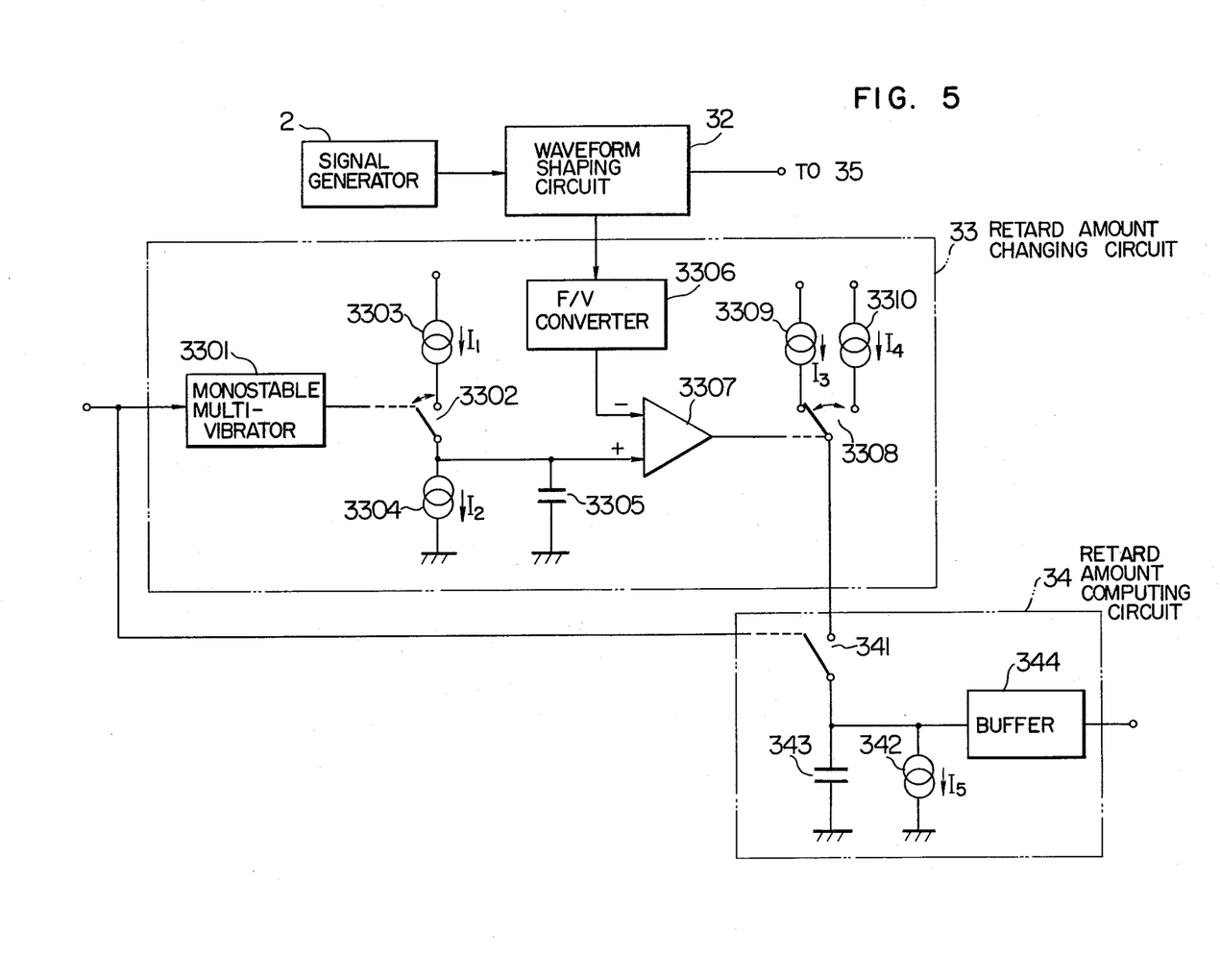
FIG. 5 is a diagram showing a detailed configuration of the retard amount changing circuit and the retard amount computing circuit in FIG. 2.

FIG. 5 shows a detailed configuration of the retard amount changing circuit 33 and the retard amount computing circuit 34. In FIG. 5, numeral 3301 designates a monostable multivibrator triggered at the fall of the monostable multivibrator 318 and held at high state for a predetermined length of time $T_2$, numeral 3302 a switch including a transistor or the like which is turned on to conduct only when the monostable multivibrator 3301 is at high level, numeral 3303 a constant current source for supplying a constant current $I_l$, numeral 3305 a charge-discharge capacitor, and 3306 a well-known frequency-voltage converter (hereinafter referred to as the F/V converter) for converting into a voltage the frequency of the signal obtained by waveform-shaping the pickup signal of the signal generator 2 through the waveform-shaping circuit 32. Numeral 3307 designates a comparator for comparing the voltage level of the capacitor 3305 with the voltage level of the F/V converter and producing a high level signal when the voltage level of the capacitor 3305 is higher. Numerals 3309 and 3310 designate constant current sources for supplying constant currents $I_3$ and $I_4$, numeral 3308 a switch for switching the constant current sources 3309 and 3310 in accordance with high or low state of the output of the comparator 3307, numeral 341 a switch which is turned on only when the monostable multivibrator 318 produces a knocking pulse, numeral 342 a constant current source for discharging a constant current $I_5$, numeral 343 a change-discharge capacitor, and numeral 344 a buffer for taking out the voltage of the capacitor 343 in stable manner.

Figure 6:
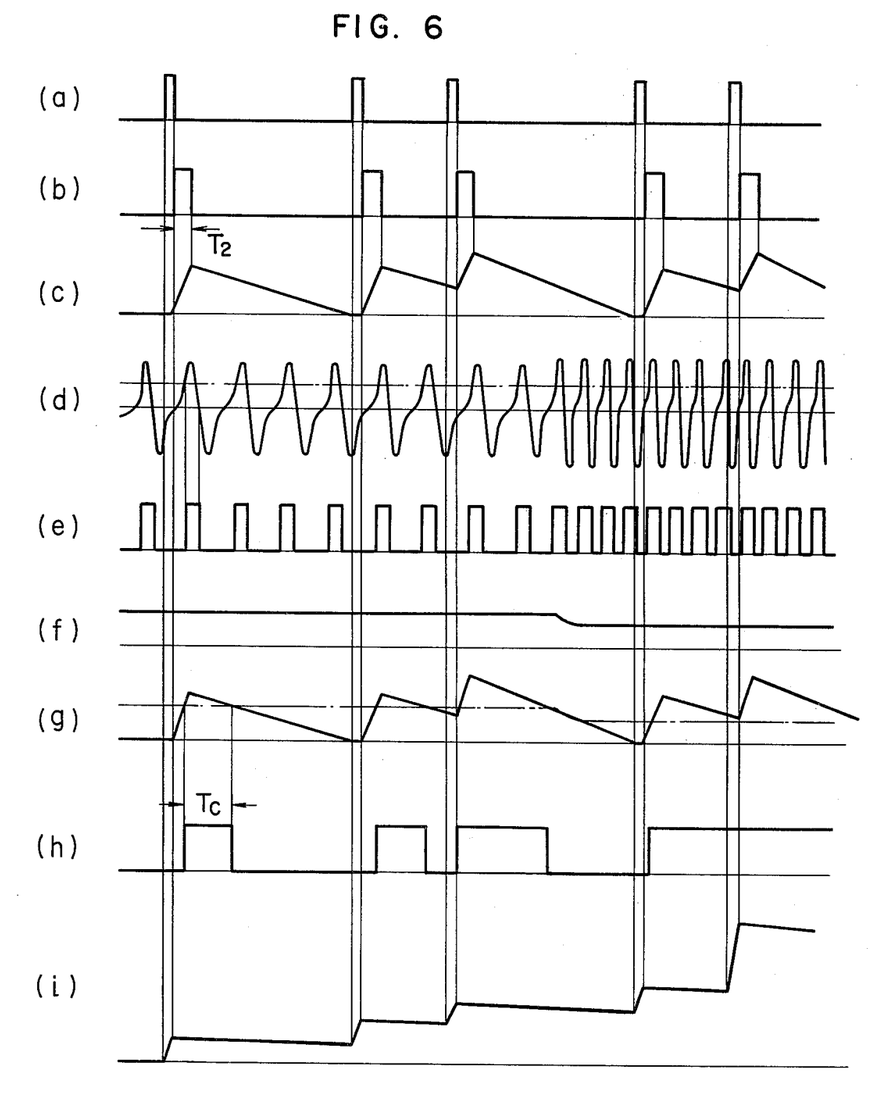
FIG. 6 shows signal waveforms produced at various parts in FIG. 5.

The operation of the retard amount changing circuit 33 and the retard amount computing circuit 34 with reference to FIG. 6, in which the abscissa represents the time and the ordinate the voltage. FIG. 6(a) represents knocking pulses produced from the monostable multivibrator 318. FIG. 6(b) shows an output of the monostable multivibrator 3310 which is triggered at the leading edge of the knocking pulse and held at high level for a predetermined length of time $T_2$. When the output signal (FIG. 6(b) of the monostable multivibrator 3301 is raised to high state, the switch 3302 is turned on so that the constant current $I_1$ is supplied to the charge-discharge circuit 3304 and 3305, with the result that the capacitor 3305 charges and discharges as shown in FIG. 6(c). FIG. 6 (d) shows the waveform of the pickup signal produced from the signal generator 2. In FIG. 6(d), one dot chain represents a threshold level for shaping the waveform of the pickup signal by the waveform shaping circuit 32. FIG. 6 (e) shows a signal obtained by waveform-shaping the pickup signal by the waveform-shaping circuit 32. The pickup signal of the signal generator 2 is generated in synchronism with the engine speed, and therefore, when the engine speed changes from low to high, for instance, the pickup signal is "compressed" along the time axis (the frequency increases) as shown in FIG. 6(d). As a result, the duty factor of the waveform-shaped signal (FIG. 6(e) changes with the increase in the frequency in accordance with the engine speed. This signal is frequency-voltage converted at the F/V converter thereby to produce a signal as shown in FIG. 6 (f). The F/V converter is of two types, one for increasing the voltage with the increase of frequency, the other for decreasing the voltage with the increase of frequency. This embodiment uses an F/V converter of the latter type in which the voltage is decreased with the increase of frequency. Thus, as shown in FIG. 6(f), the voltage changes downward when the frequency of the pickup signal of the signal generator increases with the increase of engine speed.

The voltage level (FIG. 6(c)) of the capacitor 3305 is compared with the threshold level (FIG. 6(f)) set by the F/V converter at the comparator 3307 as shown in FIG. 6(g). In FIG. 6 (g), the solid line represents the voltage level (equal to FIG. 6 (d)) of the capacitor 3305, and the one-dot chain represents the threshold hold level (equal to FIG. 6(f)). The graph of FIG. 6(h) shows the output of the comparator 3307. This signal is held high only when the voltage level of the capacitor 3305 is higher than the threshold level. The time Tc during which the signal under consideration is held at high level is capable of being set as desired by the current value of the constant current source 3303 and the capacitance of the capacitor 3305. Once the constants thereof are determined, however, the time Tc changes with the change of the threshold level. The time Tc thus changes with the engine speed. In this way, the signal of FIG. 6(h) functions as a timer for counting the predetermined time Tc determined by the engine speed from the occurrence of a knocking. FIG. 6(h) shows the manner in which with the increase of engine speed, the threshold level is decreased and the time Tc is increased accordingly. In the event that another knocking occurs before having counted the predetermined time Tc, the time counting is of course resumed at that particular point. Depending on whether the output signal (FIG. 6(h)) of the comparator 3307 is high or low, the switch 3308 is operated, so that the constant current source 3309 or 3310 is turned on. On the assumption that the constant current $I_3$ is larger than $I_4$, the constant current source 3309 is turned on when the signal of FIG. 6(h) is at high level, while the constant current source 3310 is turned on when the signal of FIG. 6(h) is at low level, so that a larger current $I_3$ is supplied when the signal is at high level.

The knocking pulse (FIG. 6(a)) produced from monostable multivibrator 318 activates the switch 341 of the retard amount computing circuit 34. When the switch 341 is turned on, the current $I_3$ or $I_4$ determined by the retard amount changing circuit 33 is supplied to the charge-discharge circuits 342 and 343. The voltage of the capacitor 343 under this condition provides an actual retard amount. The voltage of FIG. 6(i) corresponds to such a retard amount. When the interval of two knockings is shorter than the time Tc set according to the engine speed, it is decided that a transient condition is involved so that the retard amount per knocking is increased; while the interval of two knockings is longer than the time Tc, on the other hand, it is decided that the normal condition is involved and a small retard amount is maintained. By adjustment of the zero point of the threshold level or gain, the threshold level is increased in very low speed range thereby to extremely shorten the time T, thus substantially mullifying the function of increasing the retard amount.

Figure 7:
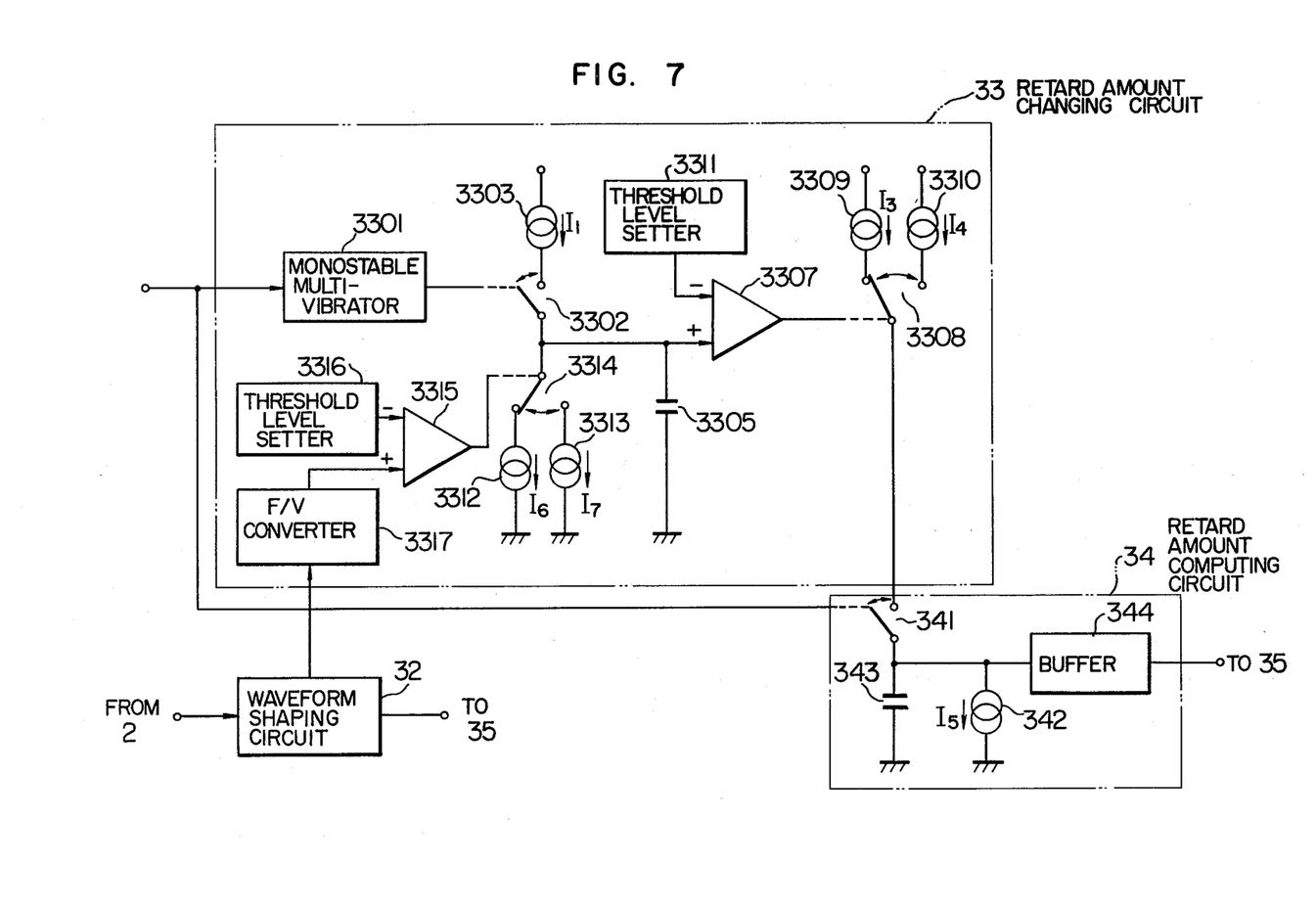
FIG. 7 is a diagram showing a detailed configuration of the retard amount changing circuit and the retard amount computing circuit in a second embodiment of the present invention.

A second embodiment of the present invention is shown in FIG. 7. This embodiment is different from the first embodiment in that the threshold level applied to the comparator 3307 is fixed and the discharge of the charge-discharge circuits 3304 and 3305 in FIG. 5 is changed with engine speed. The configuration of this embodiment will be described with reference to FIG. 7. Numeral 3317 designates an F/V converter which is different from that of the first embodiment in that the voltage thereof increases with the increase of frequency. Numeral 3316 designates a threshold voltage setter including a resistor or the like, and numeral 3315 a comparator for comparing the output of the F/V converter 3317 with the threshold level and producing a high-level signal when the output of the F/V converter is larger. Numerals 3312 and 3313 designate constant current sources for supplying constant currents $I_6$ and $I_7$ respectively, numeral 3314 a switch for turning on the constant current source 3312 or 3313 in accordance with the output level of the comparator 3315, and numeral 3311 a threshold voltage setter for setting a threshold level.

Figure 8:
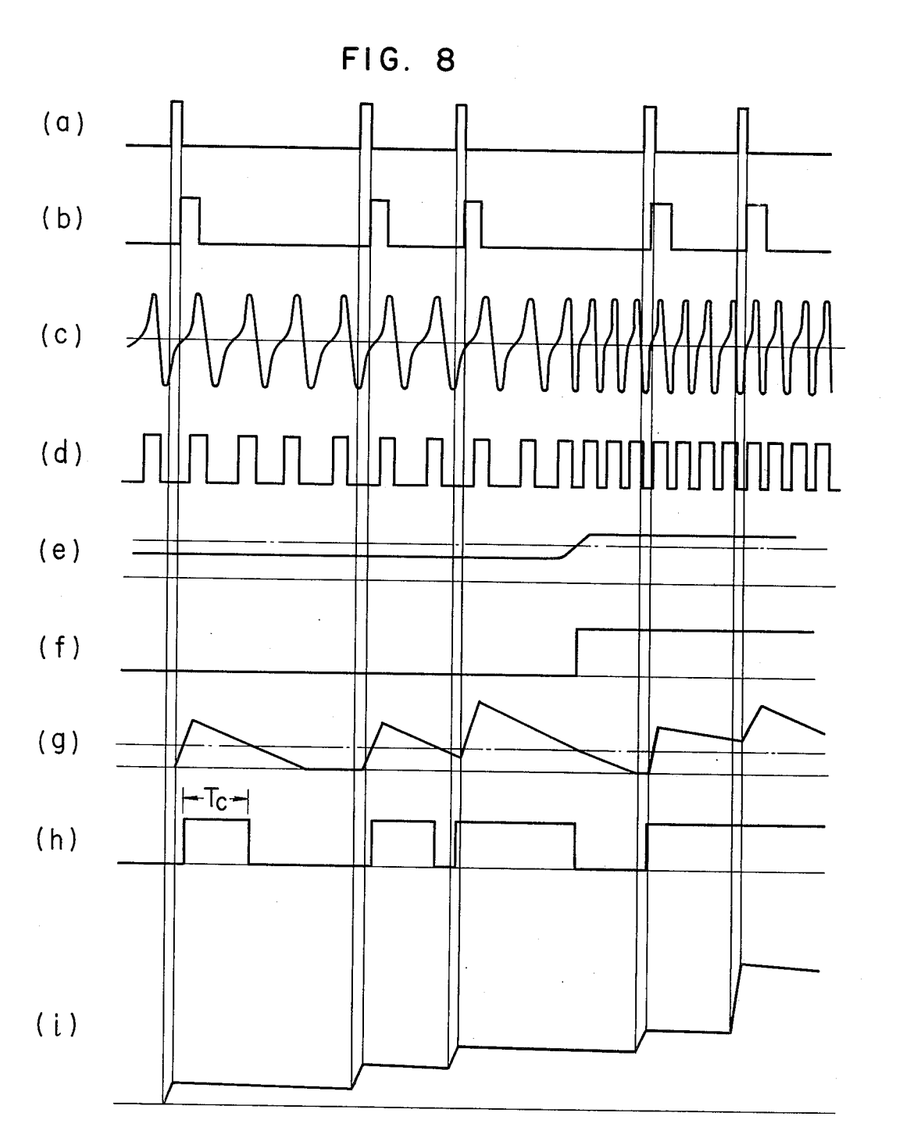
FIG. 8 shows signal waveforms produced from various parts in FIG. 7.

The operation of this circuit will be explained with reference to FIG. 8. FIG. 8(a) shows knocking pulse signals, FIG. 8(b) an output of the monostable multivibrator 3301, FIG. 8(c) a pickup signal produced from the signal generator, and FIG. 8(d) a signal obtained by waveform-shaping the pickup signal. The operation of these circuits were described in the first embodiment and will not be explained again. FIG. 8(e) shows an output voltage of the F/V converter 3317 which increases with engine speed (the principle being the same as that of the first embodiment). The one-dot chain in FIG. 8(e) shows a voltage produced from the threshold voltage setter 3316. FIG. 8(f) shows an output of the comparator 3315. Depending on whether the output signal (FIG. 8(f) of the comparator 3315 is high or low, the switch 3314 is changed over to turn on the constant current source 3312 or 3313. Assuming that the constant current $I_6$ is smaller than $I_7$, the constant current source 3312 is turned on when the signal of FIG. 8(f) is at high level, and the constant current source 3313 is turned on when the signal of FIG. 8(f) is at low level, so that the smaller current $I_6$ is supplied when the signal is at high level. The engine speed $N_l$ determined by the threshold level voltage setter 3316 is thus set as a boundary, and the comparatively small constant current $I_6$ is supplied at engine speeds higher than $N_l$, while the comparatively large constant current $I_7$ is supplied at engine speeds lower than $N_l$, thus switching the discharging condition of the capacitor 3305. FIG. 8(g) shows such charge-discharge conditions of the capacitor 3305. The one-dot chain in FIG. 8(g) represents the threshold level of the threshold voltage setter 3311. FIG. 8(h) shows the output of the comparator 3307, from which it is seen that the time Tc ischanged in accordance with the engine speed. The operation of subsequent stages will not be explained as they are identicaql to those of the first embodiment. By regulating the values of currents $I_6$ and $I_7$ and reducing the time Tc sufficiently in the engine speed ranges above or below the engine speed $N_1$, it is of course possible to substantially nullify the function of changing the retard amount in the respective ranges.

Figure 9:
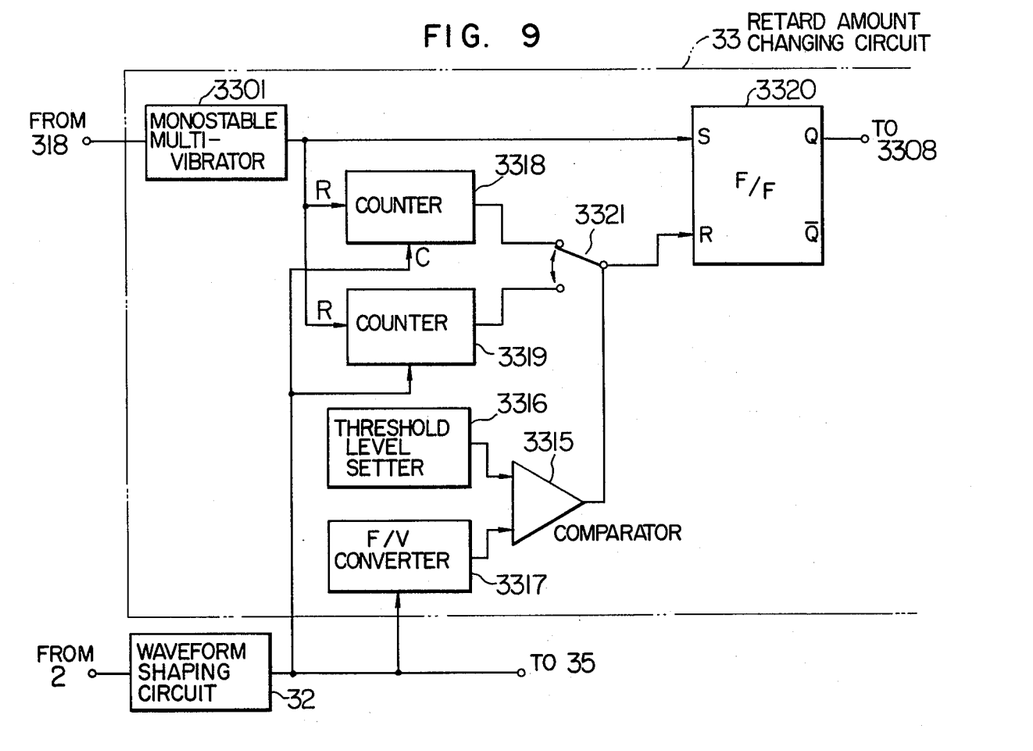
FIG. 9 is a diagram showing a detailed configuration of the retard amount changing circuit in a third embodiment of the present invention.

Instead of deciding the interval of knockings by time as in the first and second embodiments, it may alternatively be decided by the number of ignition cycle as shown in FIG. 9 as a third embodiment. The operation of the third embodiment shown in FIG. 9 will be explained. The pickup signal produced from the signal generator 2 is shaped in waveform by the waveform-shaping circuit 32 and applied as a clock signal to the counters 3318 and 3319. The pickup signal is a basic ignition timing signal produced in advance of the combustion cycle of each cylinder to determine the basic ignition timing of each cylinder. By counting the output signal obtained by shaping the waveform of the basic ignition timing signal, therefore, it is possible to determine the number of cycles. The counters 3318 and 3319 are reset by the signal produced from the monostable multivibrator 3301, so that the counters 3318 and 3319 begin to count the number of ignition cycles in response to the occurrence of a knocking. If different constants (assumed to be $C_l$ and $C_2$) are set in the counters 3318 and 3319 in advance, the counter 3318 counts the number of ignition cycles in response to the occurrence of a knocking, thereby produce an output signal when the number of cycles has reached $C_1$, while the counter 3319 produces an output signal when the number of cycles has reached $C_2$. The output signals are applied through a switch 3321 as a reset signal for a reset-set (R-S) flip-flop, and the switch 3321 activates the counter 3318 or 3319 by the functions of the F/V converter 3317, the threshold voltage setter 3316 and the comparator 3315, depending on whether the engine speed is higher or lower than a predetermined level. This operation is identical to that in the second embodiment and therefore will not be described again. The monostable multivibrator 3301, on the other hand, applies a set signal to the set (S) of the reset-set flip-flop in response to a knocking pulse. In response to the set signal, the R-S flip-flop is raised to high state and held at high stage until a reset signal is applied thereto from the counter 3318 or 3319. The R-S flip-flop is thus maintained at high state for the period corresponding to a predetermined number of cycles set according to the engine speed from the occurrence of a knocking. The output terminal of this R-S flip-flop (Q terminal) is connected to the switch 3308 mentioned in the first and second embodiments. The subsequent operation is identical to that of the first embodiment and will not be explained again.

The predetermined time or predetermined cycles may be set in accordance with the engine intake pressure or a combination of engine conditions instead of in accordance with the engine speed as in the first to third embodiments. Also, the electrical circuits making up the retard amount changing circuit 33, the retard amount computing circuit 34 and the ignition timing computing circuit 35 in the first to third embodiments may be replaced in whole or in part with equal effect by software techniques by use of a microcomputer. Such replacements are included in a fourth embodiment shown in FIG. 10.

Figure 10:
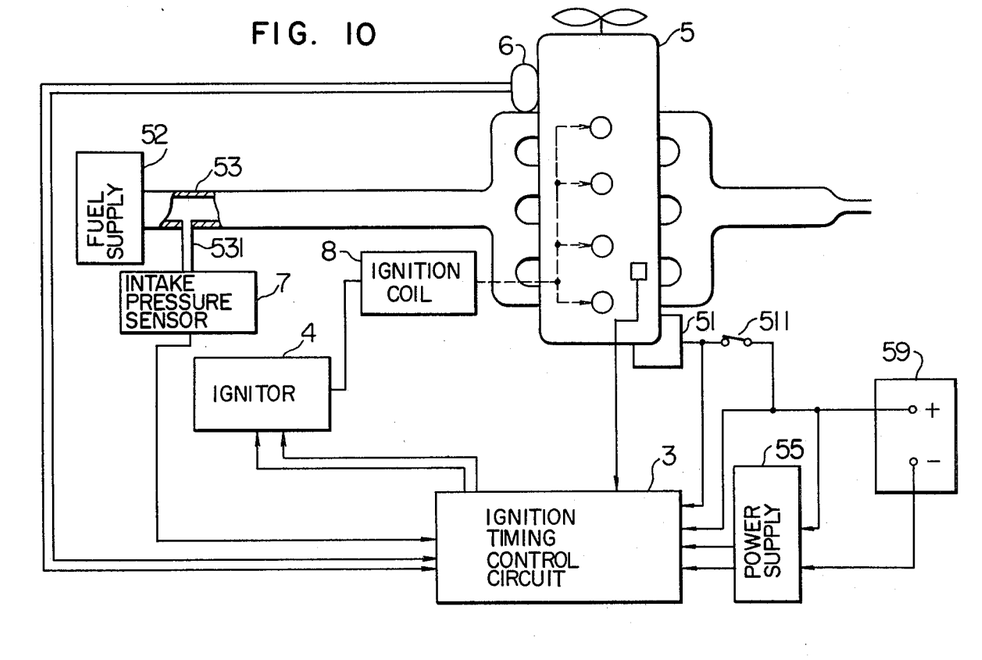
FIG. 10 is a diagram showing a general configuration of a fourth embodiment of the present invention.

In FIG. 10, numeral 5 designates a 4-cylinder 4-cycle engine, numeral 1 a knocking detector securely mounted on the engine 5 for detecting engine vibrations specific to the knocking, numeral 51 a starter, and numeral 511 a starter switch. Numeral 6 designates a rotational angle sensor for measuring the rotational angle of the engine 5, which produces a top dead center signal when the engine 5 rotates to the top dead center and a rotational angle signal for each predetermined crank angle (such as 30 degrees in this embodiment) from the top dead center, the crank angle being obtained by dividing one engine revolution into equal parts. Numeral 7 designates an intake pressure sensor for measuring the intake manifold pressure transmitted from the intake manifold 53 to the pipe 531. Numeral 52 designates a well-known fuel supply device. Numerals 4 and 8 designate an ignitor and an ignition coil as an ignition actuator. The ignition timing control circuit 3 determines the engine speed from the time intervals of the rotational angle pulses produced from the rotational angle sensor 6 on the one hand and computes the intake manifold pressure from the output voltage of the pressure sensor 7 on the other hand thereby to determine the engine operating conditions. The circuit 3 also controls the ignition timing by detecting the occurrence of a knocking from the output signal of the knocking detector 1. At the time of engine start when the ignition timing is controlled to a predetermined level, the voltage supplied from the starter switch 511 to the starter 51 is applied as a starter signal to the ignition timing control circuit 3. Also, since the energization time of the ignition coil is changed with the battery voltage, the battery voltage is applied as a battery voltage signal to the ignition timing control circuit 3. Numeral 55 designates a power supply for generating the power of a voltage required by the ignition timing control circuit 3 from the voltage of the battery 59 mounted on the vehicle.

Figure 11:
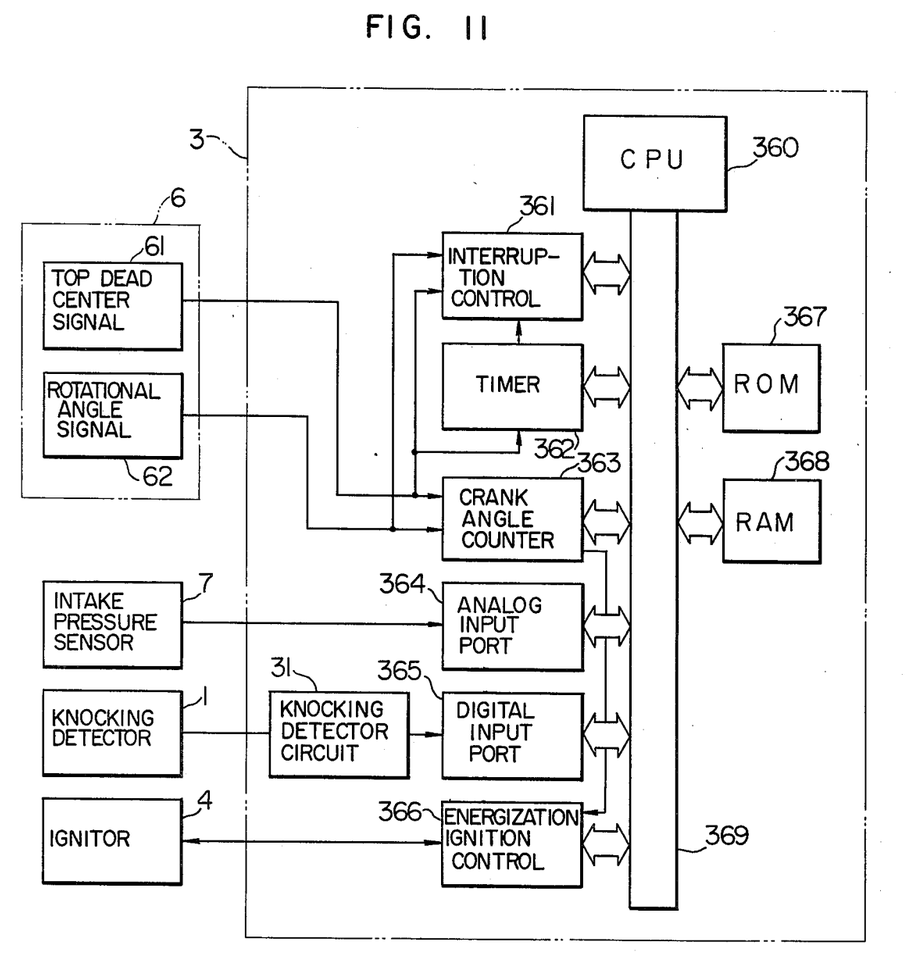
FIG. 11 is a diagram showing a detailed configuration of the ignition timing control circuit in FIG. 10.

The configuration of the ignition timing control circuit 3 included in the system of FIG. 10 is shown in FIG. 11. Numeral 360 designates a central processing unit for computing the ignition timing and includes a microcomputer of 8 bits. Numeral 367 designates a read-only memory which stores control programs and control constants. Numeral 368 designates a random-access memory used for storing the control data during the operation of the CPU 360 according to a control program. Numeral 361 designates an interruption control section for effecting an interruption in response to the generation of the rotational angle signal pulse from the engine rotational angle sensor 6.

A timer section 362 includes a 16-bit counter for counting the clock pulses generated for every 8 μs and a latch for holding the count each time of generation of the rotational angle signal from the rotational angle sensor 6. By the interruption in response to the generation of a rotational angle pulse, the CPU 360 reads out the value of the crank angle counter 363 to determine the engine rotational angle position on the one hand and reads out the value of the latch of the timer section 362 on the other hand. This operation is performed for two rotational angle positions to determine the difference between two values of the latch, thereby measuring the time required by the engine to rotate between the two rotational angles on the one hand and the engine speed on the other hand.

The crank angle counter section 363 counts up in response to the rotational angle signal produced from the rotational angle sensor 6 and is reset to "0" when a rotational angle signal is generated following the top dead center signal into synchronism with engine rotations. It is thus possible to determine the engine rotational angle position by the units of 30 degrees crank angle from the successive values of the crank angle counter produced by the CPU.

A digital input-output port 365 is used for input and output of logic signals and is supplied with the voltage level supplied from the starter switch 511 to the starter 51 to recognize that the starter switch 511 is turned on at the time of engine start. The port 365 is also used for generating a program interruption signal supplied to the interruption control section 361. The knocking detector circuit 31 is the same as the one included in the first embodiment and an output signal thereof in the form of a knocking pulse is applied to the digital input port 365.

The analog input port 364, which is for measuring the voltage of the analog signal, subjects the battery voltage to analog-digital conversion in order to compensate for the output voltage signal of the intake pressure sensor 7 for measuring the intake manifold pressure of the engine 5 and the battery voltage for the energization time of the ignition coil 8.

An energization-ignition control section 366 is for producing energization and ignition signals for the coil current actuator circuit of the ignitor 4. This energization-ignition control section 366 includes several down counters and, in response to the instructions of the CPU on the value of the crank angle counter for starting the counting of the down counters and the down counts, is reduced to "0" for energization and "1" for ignition when the value of the down counters is "0". Numeral 369 designates a common bus, through which control and data signals are transmitted by the CPU for transmission and receipt of the control and data of the peripheral circuits.

Figure 12:
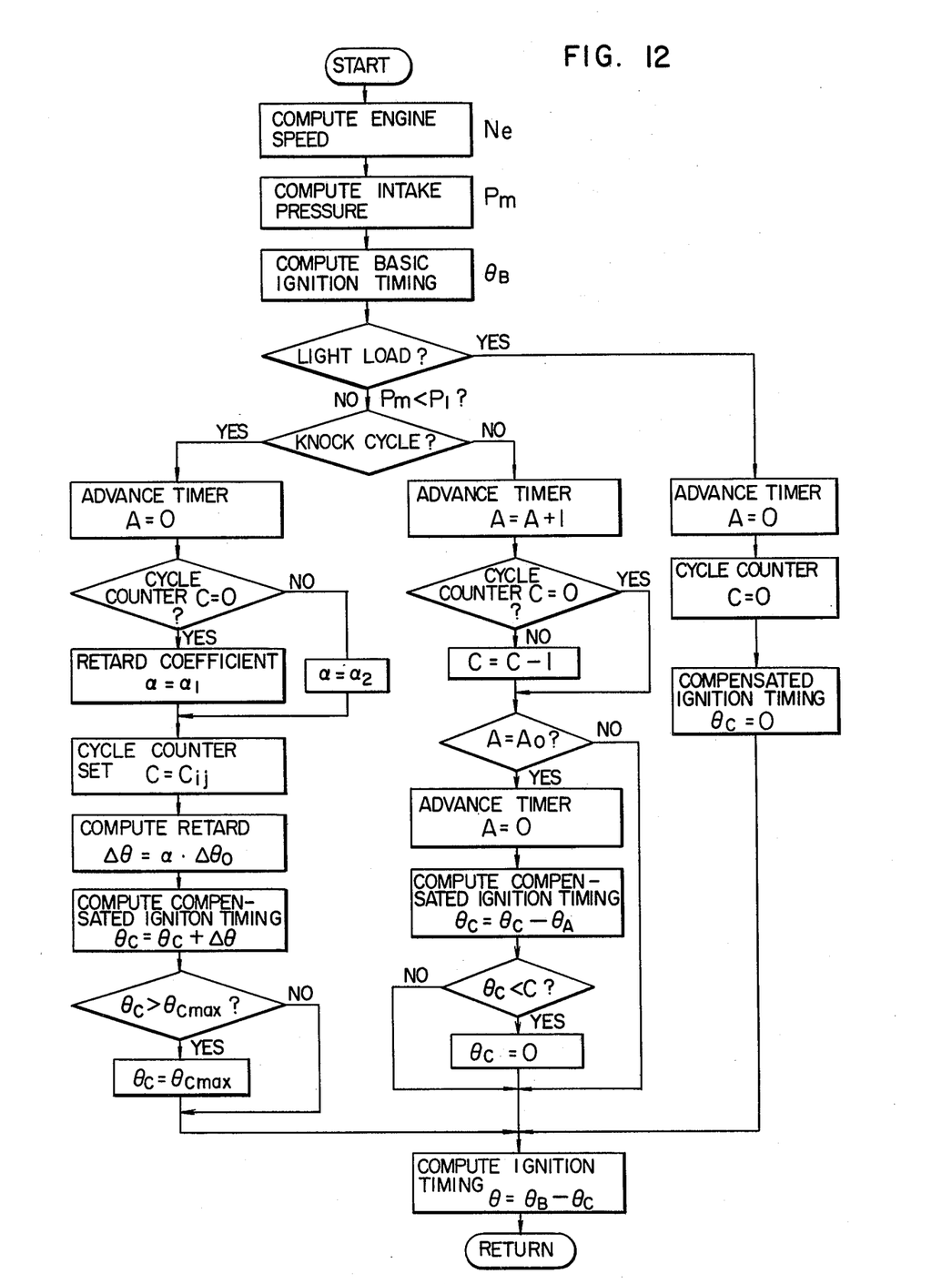
FIG. 12 is a flowchart showing the sequence of operating processes in the ignition timing control circuit shown in FIG. 11.

A method of computing the ignition timing will be explained. FIG. 12 shows a flowchart of an example of the method of computing the ignition timing. First, a basic ignition timing $\theta_B$ (a two-dimensional map including the engine speed and intake pressure) is determined, which corresponds to the operating conditions stored in the memory on the basis of the engine speed Ne and the intake pressure Pm determined by the rotational angle sensor and the intake pressure sensor signals. If the intake pressure Pm is smaller than $P_l$(say, $-360$ mmHg), it is decided that a light load is involved in which a knocking nevers occurs. If the intake pressure Pm is larger than $P_l$, on the other hand, it is decided whether or not the combustion cycle involved is a knocking cycle depending on whether or not a knocking pulse is received from the knocking detector circuit. If a knocking cycle is decided, the advance timer is reset (A = 0). The value of a cycle counter C for counting the cycles predetermined according to the engine conditions is read thereby to determine the number of ignition cycles between the present knocking and the preceding knocking. If the value of C is not zero, knockings are assumed to have occurred successively in the predetermined cycles and the retard coefficient α is made $\alpha_2$. If C is zero, on the other hand, the predetermined cycles or more have already passed, and therefore the coefficient α is made $\alpha_1$ ($\alpha_1 < \alpha_2$). In order to count the ignition cycles from the present knocking, the cycle counter is set to a predetermined number of cycles corresponding to the engine speed and the intake pressure (C =Cij). Examples of the values Cij set by the cycle counter are shown in the table below. t,0270

The value of Cij is sej to zero for the engine speed of, say, more than 4800 rpm in order to substantially nullify the function of changing the retard amount by the successive occurrence of knockings in that range.

The retard amount $\Delta\theta$ and the compensated ignition timing $\theta c$ are computed from $\Delta\theta=60 \cdot \Delta\theta o$ and $\theta c=\theta c+\Delta\theta$, where $\Delta\theta o$ is the basic unit of retard amount and may take the value of 0.5° CA, for instance. Assuming that $\alpha_1=1$ and $\alpha_2=4$, $\theta\Delta=2$ CA (4 ×0.5) if knockings occur successively during the predetermined cycles, and $\Delta\theta=0.5$ CA (1 × 0.5) otherwise. The compensated ignition timing $\theta c$ is the retard from the basic ignition timing. The value $\theta c$ has an upper limit $\theta c$max which functions as a limiter for preventing a further retard. The final ignition timing $\theta$ for the next ignition is determined from $\theta=\theta_B-\theta_C$.

In the case where the present combustion cycle is not a knocking cycle, on the other hand, the advance timer is counted up by one (A=A+1). The cycle counter C is then counted down to count the number of ignition cycles form the preceding knocking. Further, it is determined whether or not the advance timer has reached a predetermined number, and if it has reached the predetermined number, the compensated ignition timing is reduced by $\theta_A$ (such as 0.5° CA) thereby to correct the ignition timing in the advancing direction.

When Pm is smaller then P₁, a light load is involved under which knockings do not occur, and therefore the advance timer A and the cycle counter C are reset to zero while at the same time setting the compensated ignition timing to zero. In this case, the ignition timing $\theta$ is equal to $\theta_B$ for the most advanced condition. By rapidly attaining the most advanced state under a light load, the performance loss which otherwise might be caused by the retard is prevented. In this way, the ignition timing is computed and the engine is ignited through the ignitor and the coil.

It will be understood from the foregoing detailed description that according to the present invention, a successive occurrence of knockings is detected to change the retard amount per knocking, and the period during which the successive occurrence of knockings occur is changed according to the engine conditions, thus leading to the great advantage that the operating performances under both the normal and transient conditions are greatly improved. Further, according to the present invention, the retard amount per knocking is changed according to the manner of successive occurrence of knockings on the one hand and the function of changing the retard amount is substantially nullified under predetermined engine conditions, with the result that the operating performances under both normal and transient conditions are improved while at the same time reducing the erroneous decision on knocking and output decrease under predetermined operating conditions.

We claim:

1. An ignition timing control system for internal combustion engines, comprising:
   an engine sensor for detecting conditions of the engine,
   a knocking detector circuit for detecting knockings of an internal combustion engine, and producing an ignition timing retard amount per knocking,
   a control unit for generating an ignition timing control signal in response to output signals of the engine sensor and said knocking detector, and
   an ignitor for generating an ignition signal in response to the ignition timing control signal from said control unit, said control unit comprising:
   means for changing the retard amount per knocking depending on whether another knocking is decided before the lapse of a predetermined interval from the decision of a knocking, and
   means for changing said predetermined interval in accordance with the engine conditions detected by said engine sensor.

2. An ignition timing control system for internal combustion engines comprising:
   a knocking detector circuit for detecting knockings of an internal combustion engine, and producing an ignition timing retard amount per knocking,
   a control unit for generating an ignition timing control signal in accordance with an output signal produced from said knocking detector,
   an ignitor for generating an ignition signal in response to the ignition timing control signal from said control unit;
   said control unit comprising:
   means for changing the retard amount per knocking depending on whether another knocking is decided before the lapse of a predetermined interval from the decision of the knocking,
   knocking detection means responsive to the output signal of said knocking detector for comparing the output signal of said knocking detector with a reference value, and
   retard amount computing means responsive to a retard amount signal corresponding to a retard amount per one knocking derived from the output of said changing means;
   said knocking detection means comprising a rectifier for rectifying the output signal of said knocking detector, an integrator for integrating the output signal of said rectifier to provide an average value of output signal of said knocking detector, an offset voltage generator for providing a noise margin signal to an output signal of said integrator, an adder for receiving the output signal of said integrator and the output signal of said offset voltage generator to provide a knocking decision level, and a comparator for comparing the output signal of said rectifier and the knocking decision level of said comparator to provide a knocking present signal.

3. An ignition timing control system for internal combustion engines comprising:
   a knocking detector circuit for detecting knockings of an internal combustion engine, and producing an ignition timing retard amount per knocking,
   a control unit for generating an ignition timing control signal in accordance with an output signal produced from said knocking detector,
   an ignitor for generating an ignition signal in response to the ignition timing control signal from said control unit;
   said control unit comprising means for changing the retard amount per one knocking depending on whether another knocking is decided before the lapse of a predetermined interval from the decision of the knocking, said changing means comprising a monostable circuit responsive to the knocking present signal to provide a predetermined time signal, a first electrical switch responsive to the predetermined time signal to provide a charging current signal and a discharging current signal, a capacitor charged and discharged by the charging current signal and the discharging current signal, a comparator for comparing the output voltage of said capacitor with a pickup signal of a signal generator to provide an actuation signal, and a second electrical switch operable by the actuation signal of said comparator to provide a first and a second constant current signal.

4. An ignition timing control system for internal combustion engines comprising:

a knocking detector circuit for detecting knockings of an internal combustion engine, and producing an ignition timing retard amount per knocking, a control unit for generating an ignition timing control signal in accordance with an output signal produced from said knocking detector, an ignitor for generating an ignition signal in response to the ignition timing control signal from said control unit, wherein said control unit comprises:

means for changing the retard amount per knocking depending on whether another knocking is decided before the lapse of a predetermined interval from the decision of the knocking;

knocking detection means responsive to the output signal of said knocking detector for comparing the output signal of said knocking detector with a reference value; and retard amount computing means responsive to a retard amount signal corresponding to a retard amount per knocking derived from the output of said changing means, said retard amount computing means comprising an electric switch operable by the knocking present signal of said knocking detection means, a capacitor charge by said first and second current signals, and a current source connected in parallel with said capacitor.

5. An ignition timing control system for internal combustion engines, including an engine sensor for detecting conditions of the engine, a knocking detector for detecting knockings of an internal combustion engine, a control unit for generating an ignition timing control signal in response to an output signal of the engine sensor and an output signal of said knocking detector, and an ignitor for generating an ignition signal in response to the ignition timing control signal produced from said control unit; wherein said ignition timing control circuit comprises means for changing the retard amount per knocking depending on whether another knocking is decided before the lapse of a predetermined time interval from the decision of a knocking, means for changing said predetermined interval in accordance with the engine conditions detected by said engine sensor, and means for substantially nullifying the function of changing the retard amount under predetermined engine conditions.

6. A system according to claim 1 wherein said control unit further comprises knocking detection means responsive to the output signal of said knock detector for comparing the output signal of said knock detector with a reference value, and retard amount computing means responsive to a retard amount signal corresponding to a retard amount per one knocking derived from the output of said changing means.

7. A system according to claim 6 wherein said knocking detection means comprises a rectifier for rectifiering the output signal of said knocking detector, an integrator for integrating the output signal of said rectifier to provide an average value of output siganl of said knocking detector, an offset voltage generator for providing a noise margin signal to an output signal of said integrator, an adder for receiving the output signal of said integrator and the output signal of said offset voltage generator to provide a knocking decision level, and a comparator for comparing the output signal of said rectifier and the knocking decision level of said comparator to provide a knocking present signal.

8. system according to claim 1 wherein said changing means comprises a monostable circuit responsive to the knocking present signal to provide a predetermined time signal, a first electrical switch responsive to the predetermined time signal to provide a charging current signal and a discharging current signal, a capacitor charged and discharged by the charging current signal and the discharging current signal, a comparator for comparing the output voltage of said capacitor with a pickup signal of a signal generator to provide an actuation signal, a second electrical switch operable by the actuation signal of said comparator to provide a first and a second constant current signal.

9. A system according to claim 8 wherein said retard amount computing means comprises an electric switch operable by the knocking present signal of said knocking detection means, a capacitor charged by said first and second current signal and a current source connected in parallel with said capacitor.

10. A system according to claim 1 wherein said control unit includes a microcomputer comprising the steps of:

deciding whether the occurrence of knocking is present or absent;

deciding through a value of a counter C whether the predetermined interval beginning from the time when the occurrence of a previous knocking is decided is lapsed or not;

setting a retard coefficient $\alpha$ to a first predetermined value $\alpha_1$ when it is decided that said predetermined time interval is lapsed;

setting the retard coefficient $\alpha$ to a second predetermined value $\alpha_2$ when it is decided that said predetermined time internal is not lapsed;

setting the value of counter C to a third predetermined value; and computing a retard amount $\Delta\theta$ from the retard coefficient $\alpha$.

11. A system according to claim 1 wherein said changing means provides a large retard amount when said predetermined interval is short and provides a small retard amount when said predetermined interval is long.

* * * * *